United States Patent Office 3,143,997
Patented Aug. 11, 1964

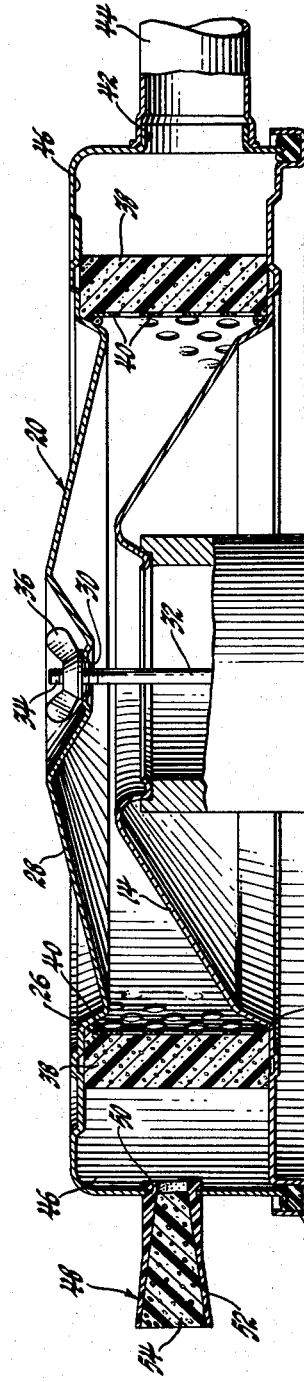

3,143,997
FILTER CAPACITY INDICATOR
Carl W. Norberg and William D. Pittsley, Flint, Mich., assignors to General Motors Corporation, Detroit, Mich., a corporation of Delaware
Filed Oct. 18, 1962, Ser. No. 231,530
2 Claims. (Cl. 116—114)

This invention relates to filter capacity indicators, and more particularly to a device for indicating the condition of a filter element.

In many items of manufacture, such as automobiles, air cleaner assemblies are used to filter the air necessary for the combustion process in the engine. The air cleaner assembly is generally mounted over the engine carburetor and all incoming air passes through a suitable filter element for the removal of dirt, dust and other impurities. The construction of the generally available air cleaner assembly is such that the entire device must be taken apart in order to check or test the filter element to determine whether or not it is properly functioning. If the element is clogged with dirt or dust the efficiency of the engine is greatly decreased and it is advisable to clean or replace the filter element. The entire disassembly of the air cleaner assembly for this purpose is vexatious and time consuming, and it is understandable that many times it will be found that the filter element need not be replaced.

The device in which this invention is embodied comprises, generally, an indicating device insertable in the side wall of the air cleaner assembly and which contains a filter media of substantially the same material as that of the filter element. The indicating device may be housed in a transparent tube or may be removable from the side wall of the air cleaner assembly to permit inspection of the indicator filter media without complete disassembly of the air cleaner device. This permits a ready and simple inspection method of determining whether or not the filter element in the air cleaner assembly needs to be changed. The filter media in the indicator is so placed and is of sufficient size and density to reflect the condition of the filter element in the air cleaner assembly.

It is thus not necessary to disassemble the entire air cleaner assembly but only to view the indicator in order to determine whether or not the filter element need be changed. This may be done in a quick and simple manner, saving a considerable amount of time and effort and protecting the engine with which the air cleaner assembly is associated.

These and other advantages will become more apparent from the following description and drawing, in which:

FIGURE 1 is a view of an air cleaner-silencer assembly with parts broken away and in section, and illustrating the indicator device mounted in the side wall thereof;

FIGURE 2 is a perspective view of a modified indicating device of the type shown in FIGURE 1;

FIGURE 3 is a view of a portion of the air cleaner-silencer assembly of FIGURE 1 illustrating a modified version of the indicator device;

FIGURE 4 is a view of a portion of the air cleaner-silencer assembly of FIGURE 1 illustrating another modification of the indicator device;

FIGURE 5 is a perspective view of the indicator modification illustrated in FIGURE 4;

FIGURE 6 is a view of a portion of the air cleaner-silencer assembly of FIGURE 1 illustrating another modification of the indicator device; and FIGURE 7 is a perspective view of the indicator modification shown in FIGURE 6.

Referring more particularly to the drawing, FIGURE 1 illustrates a typical air cleaner-silencer assembly which may be mounted on a typical internal combustion engine. A lower shroud 10 is provided with a shoulder 12 and an upwardly inclined wall 14 which engages the carburetor inlet tube 16. The outer extremity of shroud 10 includes a channel section 18 which receives a suitable gasket 19. An upper cover, illustrated generally by the numeral 20, is provided with a rolled edge 24 which engages the gasket 19 in the channel 18. Cover 20 includes a shoulder 26 and an upper wall 28 which has a suitable aperture 30 formed therein. A stud 32 is secured in any suitable manner in the inlet tube 16 and is threaded as at 34 to receive a wing nut or the like 36 for securing the cover 20 and the shroud 10 together.

Mounted within the cover 20 and shroud 10 is a filter element 38 which may be formed of any suitable material, such as polyurethane foam. Within filter element 38 is a support screen 40 which provides the necessary stiffening for the filter element 38. The filter element 38 and screen 40 are held in place against the shoulders 12 and 26 of the shroud 10 and cover 20, respectively.

One portion of the surface of the cover 20 is outwardly formed, as at 42, to receive an air inlet tube 44 in any suitable manner, as by the telescoping engagement illustrated in FIGURE 1. The cover 20 and the air filter element 38 form between them an annular air inlet chamber 46 to receive the air entering through the inlet tube 44. The air from chamber 46 passes through the filter element 38 and the screen 40 and passes into the engine through the engine inlet tube 16.

At some other position in the side wall of cover 20 an indicator device, illustrated generally by the numeral 48, is disposed. The wall of cover 20 may be provided with an aperture 50 which receives the indicator device 48. The indicator device includes a casing or tubular member 52 which may be formed of a transparent material, such as Lucite, and which is filled with a suitable filter media 54. Filter media 54 may be of substantially the same material as the material from which the filter element 38 is formed, and the size and density of the filter media 54 is predetermined to reflect the condition of the filter element 38. In other words, as the filter element 38 becomes clogged and dirty, filter media 54 will also. If filter media 54 is of the proper size and density, it will become plugged or dirty at a proportional penetration rate to that of filter element 38. This is because contaminated air is moving from the upstream side of the main filter 38 to the downstream side. Correspondingly the same action takes place in the indicator filter 54, i. e., contaminated air moves through it from an upstream side to a downstream side and deposits entrained solid particles at a rate proportional to the deposit rate in the main filter.

The tubular member 52 may be open at both ends to permit air to flow through the filter media 54 and into the inlet chamber 46. This is the same air which enters inlet chamber 46 through the inlet 44 and which passes through the filter element 38. Thus the filter media 54, if properly designed, will at all times reflect the condition of the inner filter element 38.

It is possible to design the indicator device 48 in several forms in order to properly show the condition of the filter element 38. In FIGURE 2 is shown a modification of the indicator 48 in which the outer casing 52 includes a frusto-pyramidal portion 56 and a cylindrical portion 58. Cylindrical portion 58 is provided with an annular groove 60 which permits secure engagement in the aperture 50 formed in the cover 20 of the air cleaner assembly by snapping the indicator device into the cover. This also permits removal and replacement of the indicator device when necessary. The filter media 54 assumes the interior shape of the casing or housing 56.

FIGURES 4 and 5 illustrate a modification of the indicator device illustrated in FIGURE 2 in which the casing or outer tube 62 is somewhat flatter and wider than the casing 56 in FIGURE 2. The filter media 54 again assumes the interior shape of the tube 62 and the tube may be provided with a groove 64 to permit securement in the cover 20.

FIGURES 6 and 7 show another modification in which the casing 66 is formed of two members 68 and 70 suitably secured together along seams, such as 72. The filter media 54 is disposed within the casing 66 as in the other modifications.

In each of the modifications illustrated in FIGURES 2, 5 and 7, the tubular member or casing is open at both ends to permit flow of air into the inlet chamber 46 in the cover 20 through the filter media 54. It is also possible to determine the condition of the filter element 38 by disposing an indicator in the air inlet chamber 46, such as illustrated in FIGURE 3. In this modification a resilient plug, illustrated generally by the numeral 74, is provided with an enlarged head 76, a stem 78 and a body portion 80. Body portion 80 is provided with a suitable snap groove 82 to permit installation in the aperture 50 formed in the cover 20 and the body portion is of sufficient resilience to permit removal and replacement. A filter media 84 is secured in any suitable manner to the inner end of plug 74 and is disposed within the air inlet chamber 46. Air swirling through the inlet chamber and about the filter media 84 will flow through and around the filter media 84 prior to passage through the filter element 38. The filter media 84 will thus pick up impurities to an extent which is proportional to that of the filter element 38. By proper size and density design of the filter media 84 it is possible to have a direct indication of the condition of the filter element 38 when viewing filter media 84.

Thus, a filter element condition indicator is provided which is simple to manufacture and assemble, and which is readily installed in an air cleaner assembly. The device permits simple and ready inspection of the air cleaner filter element either by visual inspection or by removing the plug and indicating media. It is not necessary to disassemble the entire air cleaner assembly in order to inspect the air cleaner filter element, thus saving considerable time and effort in carrying out this operation.

What is claimed is:
1. In a filter unit designed to separate entrained solid particles from a gaseous medium moving therethrough,
   a housing having inlet and outlet openings,
   a filter element in the housing separating said openings and having an upstream side adjacent the inlet and a downstream side adjacent the outlet so that contaminants are drawn into the filter element on the upstream side by the gas moving in the filter unit on its way to the outlet, the combination comprising,
   an indicator device including tubular casing means having an inlet and outlet opening, a filter media within the casing means separating the inlet and outlet openings thereof and being formed of a material substantially the same as the material of said filter element, the outlet opening of said casing means being received in said housing and communicating with the gas moving within the filter unit, the inlet opening of said casing means being exposed to the contaminated gaseous medium entering said filter unit and being of larger area than said outlet opening whereby said filter media has a contaminate penetration rate proportional to that of the filter element to indicate the filtering condition thereof.

2. The filter unit as described in claim 1 wherein said casing means has an annular groove at the outlet end formed in the exterior thereof and
   said housing has an aperture formed therein on the upstream side of the filter element which is adapted to frictionally engage said groove for movably holding said indicator device in place.

References Cited in the file of this patent
UNITED STATES PATENTS

| | | |
|---|---|---|
| 2,540,492 | Schmuckler | Feb. 6, 1951 |
| 2,655,894 | Rabbitt | Oct. 20, 1953 |
| 2,966,960 | Rochlin | Jan. 3, 1961 |
| 3,095,290 | Hockett | June 25, 1963 |

UNITED STATES PATENT OFFICE
CERTIFICATE OF CORRECTION

Patent No. 3,143,997                      August 11, 1964

Carl W. Norberg et al.

It is hereby certified that error appears in the above numbered patent requiring correction and that the said Letters Patent should read as corrected below.

Column 4, line 14, for "hav-" read -- having --; line 34, for "movably" read -- removably --.

Signed and sealed this 4th day of May 1965.

(SEAL)
Attest:

ERNEST W. SWIDER
Attesting Officer

EDWARD J. BRENNER
Commissioner of Patents